(12) United States Patent
Botes

(10) Patent No.: US 7,640,454 B1
(45) Date of Patent: Dec. 29, 2009

(54) SYSTEM AND METHOD FOR POINT-IN-TIME RECOVERY OF APPLICATION RESOURCE SETS

(75) Inventor: Par Botes, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 508 days.

(21) Appl. No.: 10/878,955

(22) Filed: Jun. 28, 2004

(51) Int. Cl.
*G06F 11/00* (2006.01)
(52) U.S. Cl. .......................................... 714/19; 714/20
(58) Field of Classification Search ................... 714/19, 714/38, 20; 711/161; 707/200–206
See application file for complete search history.

(56) References Cited

U.S. PATENT DOCUMENTS

| | | | |
|---|---|---|---|
| 4,296,464 A * | 10/1981 | Woods et al. | 710/308 |
| 5,745,669 A * | 4/1998 | Hugard et al. | 714/3 |
| 6,240,511 B1 * | 5/2001 | Blumenau et al. | 713/1 |
| 6,360,331 B2 * | 3/2002 | Vert et al. | 714/4 |
| 6,438,749 B1 * | 8/2002 | Chamberlain | 717/174 |
| 6,477,663 B1 * | 11/2002 | Laranjeira et al. | 714/11 |
| 6,549,921 B1 | 4/2003 | Ofek | |
| 6,578,045 B1 * | 6/2003 | Gray et al. | 707/103 R |
| 6,728,895 B1 | 4/2004 | Nelson | |
| 6,732,123 B1 | 5/2004 | Moore et al. | |
| 6,820,214 B1 * | 11/2004 | Cabrera et al. | 714/15 |
| 6,883,120 B1 * | 4/2005 | Banga | 714/47 |
| 7,055,062 B2 * | 5/2006 | Shah et al. | 714/15 |
| 2001/0008019 A1 * | 7/2001 | Vert et al. | 714/1 |
| 2002/0059328 A1 * | 5/2002 | Watkins | 707/203 |
| 2005/0216527 A1 * | 9/2005 | Erlingsson | 707/202 |

OTHER PUBLICATIONS

"Windows System Restore." (Aug. 2000). MSDN Library, Microsoft, Inc. Retrieved Feb. 2, 2007, from http://msdn2.microsoft.com/en-us/library/ms811705.aspx.*

"Use Backup to Protect Data." (Aug. 24, 2001) Microsoft, Inc. Retrieved Feb. 5, 2007, from http://www.microsoft.com/windowsxp/using/security/learnmore/backup.mspx.*

"Understanding the Windows Registry." (Jun. 2000) [Electronic version] Smart Computing, vol. 11, issue 6, pp. 24-25. Retrieved Feb. 7, 2007, from http://www.smartcomputing.com/editorial/article.asp?article=articles/2000/s1106/06s06/06s06.asp.*

* cited by examiner

*Primary Examiner*—Gabriel L Chu
(74) *Attorney, Agent, or Firm*—Meyertons, Hood, Kivlin, Kowert & Goetzel, P.C.

(57) ABSTRACT

An application uses a set of resources, where the set of resources may include a variety of software and hardware resources, such as database management software, file systems, logical volumes, and physical disks. Configuration information, including various attributes of individual resources and dependencies among resources, is used to manage the set of resources. For example, tuning parameters for a database management system and information describing the dependency of the database management software on a set of logical volumes may be maintained as part of the configuration information. A subset of this configuration information is dynamically maintained in volatile storage. Recovery software is configured to retain a previous state of the dynamically maintained configuration information by storing the previous state in persistent storage.

20 Claims, 15 Drawing Sheets

SYSTEM AND METHOD FOR POINT-IN-TIME RECOVERY OF APPLICATION RESOURCE SETS

BACKGROUND OF THE INVENTION

1. Field of the Invention

This invention is related to the field of computer systems and, more particularly, to recovery of computer systems.

2. Description of the Related Art

Computer systems and their components may reach undesirable states in various ways. For example, some undesirable states may be due to failures of hardware components, others due to erroneous software or hardware operation, and others due to malicious intrusions by viruses, worms or human agents. Some undesirable states result in application failure or system failure. Others may result in logical corruption such as incorrect data being displayed or in other undesirable behavior such as poor system performance.

A variety of approaches may be used to recover from different kinds of undesirable states. To reduce the costs of application and system failures, solutions such as clustering may be employed. When an application running on a node A of a cluster fails, or when the node fails, the application may be failed over to another node B. To mitigate the risk of logical corruption, backup copies of data may be stored periodically on various storage devices. When data corruption is discovered, a backed up version of the data may be used to restore the state of the data to an acceptable previous state.

One approach to the problem of logical corruption is to provide functionality that restores the state of a component to its state as of a given earlier point in time at which the component was known to be functioning in an acceptable state. The user of the functionality may choose the point in time to which the state is restored, typically from a set of possible points in time, where the set of possible points of time varies with the implementation of the functionality. This functionality is known as point-in-time recovery. Some database management systems may provide functionality for point-in-time recovery of the data in the database tables. Similarly, some data storage vendors may provide functionality to revert the state of data on a disk or on a set of disks to the state as of an earlier point in time. The manner of selecting the point of time to which recovery is desired may vary with component type and solution vendor. For example, some vendors may support recovery only to some discrete point in time, such as the time of the last database checkpoint, rather than to any arbitrary instant.

The problem of point-in-time recovery is more complicated for complex applications that depend upon a set of interdependent hardware and software resources to function. For example, an application may utilize resources such as application software and libraries, a database management system, file systems, disk volumes, physical disks, TCP/IP host and port information, and network interface cards. Some of these resources depend upon others; for example, file systems may not work unless the underlying disk volumes and physical disks are functioning correctly. In order for the application to provide acceptable operation, all the resources must be functioning. In such complex applications, the set of resources may change over time, and the dependencies among the resources may also change over time. In addition to the factors described earlier that can lead to applications reaching undesirable states (hardware failures, intrusions and the like), suboptimal resource configurations can also lead to undesirable states for complex applications.

As mentioned above, backup copies of application data may be stored periodically on various storage devices. In the event that recovery from an undesirable application state is desired, such backup copies can be used to restore the application data to an earlier state. However, in cases where the set of resources used by an application changes over time, or where the dependencies among the resources change over time, or where suboptimal resource configurations contribute to the application reaching an undesirable state, the restoration of the data state alone may not be sufficient to bring the application back to a desired earlier operational state.

SUMMARY OF THE INVENTION

Various embodiments of a computer system for point-in-time recovery of application resource sets are disclosed. In one embodiment, an application uses a set of resources, where the set of resources may include a variety of software and hardware resources, such as database management software, file systems, logical volumes, and physical disks. Configuration information, including various attributes of individual resources and dependencies among resources, is used to manage the set of resources. For example, tuning parameters for a database management system and information describing the dependency of the database management software on a set of logical volumes may be maintained as part of the configuration information. A subset of this configuration information is dynamically maintained in volatile storage. Recovery software is configured to retain a previous state of the dynamically maintained configuration information by storing the previous state in persistent storage.

For a variety of reasons, it may be desired to restore the set of resources used by the application to an earlier state. For example, the application may have reached an undesirable or suboptimal state due to erroneous software or hardware operation, malicious intrusions by viruses or worms, etc. In one embodiment, the recovery software may use the retained state of the configuration information to restore the resource set to the previous state. In another embodiment, the recovery software may detect an occurrence of an undesirable application state, and restore the resource set to a previous state in response to the detection of the occurrence of the undesirable state.

A variety of approaches may be used in deciding when a previous state of the dynamically maintained configuration information is stored in persistent storage. In one embodiment, a previous state may be stored to persistent storage in response to a change in state of the configuration information. In a second embodiment, a state may be stored as part of an operation to back up application data. In yet another embodiment, a state may be stored according to a schedule, for example, by storing a state at the end of every hour.

Recovery functionality similar to that described above may be employed in several different specific computer system configurations. In one embodiment, for example, the computer system may be configured as a cluster of nodes, where the application and recovery software run on a first node, and additional recovery software runs on the remaining nodes.

Figure 1:
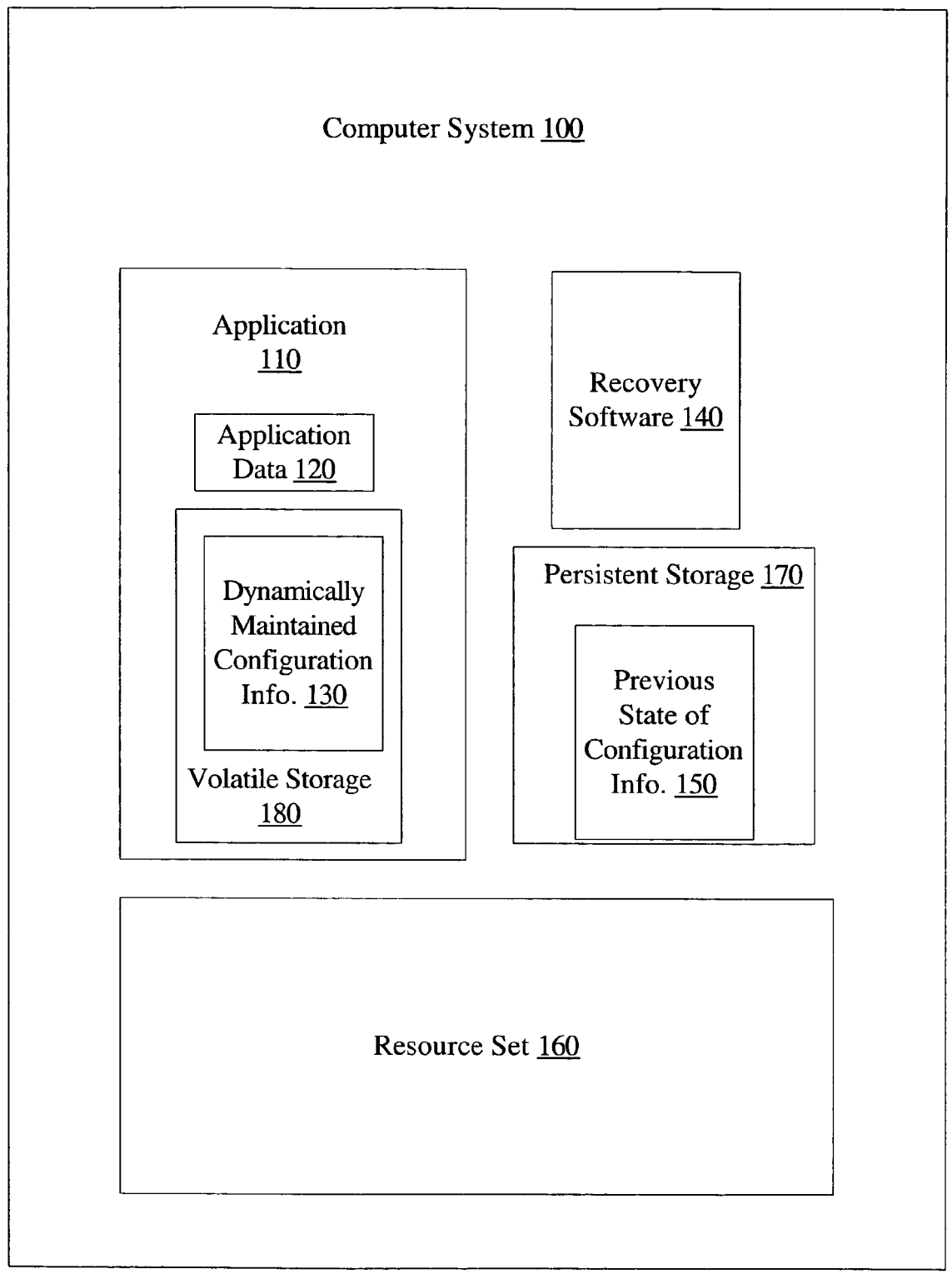
FIG. 1 is a block diagram of one embodiment of a computer system

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram is shown illustrating one embodiment of a computer system 100. The computer system 100 includes an application 110, a resource set 160, recovery software 140, volatile storage 180 and persistent storage 170. The volatile storage 180 is a subset of the total volatile storage in the computer system, and the persistent storage 170 is a subset of the total persistent storage in the computer system.

Application 110 may, in general, be any application that manipulates application data 120 and utilizes a resource set 160 in order to provide desired functionality. During normal operation, application 110 may manipulate application data 120 in volatile storage, and may move application data between volatile storage and persistent storage as needed. Thus, at a given point in time, application data 120 may reside in volatile storage, in persistent storage or in a combination of volatile and persistent storage. The format and representation of application data 120 may vary with the kind of functionality provided by the application. For example, for an application managing bank accounts, application data 120 may include bank balance information, transaction records, and the like; for an application managing meteorological data, application data 120 may include digital representations of satellite photographs, etc.

As stated above, resource set 160 comprises resources utilized by application 110. In general, resource set 160 may comprise a combination of hardware and software resources. For example, software resources that may be included in resource set 160 are application software, shared library software, database management software, file systems, storage management software at various levels of the storage hierarchy such as logical volumes, and networking software. Hardware resources may include physical disks and other devices, including various kinds of persistent storage, used by the storage management software, and networking hardware such as network interface cards. In some embodiments, resource set 160 may consist entirely of software resources or entirely of hardware resources.

Various kinds of configuration information may be required to manage resource set 160. Configuration information may include a collection of descriptions of various attributes of the state of individual resources, dependencies among the resources, and the mechanisms that are used to start (bring online), stop (take offline), and monitor the resources. The contents of the configuration information for each resource may vary with the type of resource. For example, for database management software the configuration information may include the version of the software, parameters describing the location of the managed data on file systems, networking parameters used to communicate with the database management system and for communication within its subcomponents, tunable parameters affecting the performance, and the names of executable programs that can be used to start, stop, and query the state of the database management system. For file systems, the configuration information may include the type of file system, the names of the volumes in the underlying disk group and the parameters used to mount the file system.

Configuration information for resource set 160 may also include information specifying dependency relationships among individual resources, as stated above. For example, volumes used by a file system must typically be started before the file system can be mounted. That is, for the file system to be operating normally, the volumes used by the file system must be operating normally. Thus, if application 110 uses a file system FS1, and FS1 uses a volume V1, then FS1 and V1 may be included in resource set 160, and the dependency of FS1 on V1 may be specified as part of configuration information for resource set 160.

Configuration information for resource set 160 may change over time in various ways. Individual resources from resource set 160 may be modified. For example, tunable parameters may be changed in response to the observed utilization of some resource. Resources may be added or removed from resource set 160. For example, additional resources may be applied to alleviate performance problems if application performance is found to be unsatisfactory. Changes to the configuration information may also include changes to the dependency relationships among the resources. For example, multiple network cards may be added to the resource set, which may result in new dependencies between networking software and the new network cards. Some state changes may be transient; for example, a tunable parameter is changed from value A to value B in response to some observed behavior, and then changed back to value A in response to other observed behavior.

During normal operation of computer system 100, configuration information on resource set 160 may be maintained in a variety of locations. For example, a subset of the configuration information for resource set 160 may be maintained in volatile storage. That is, some configuration information for resource set 160 may be found only within volatile storage at a given point in time, without a corresponding representation being present in persistent storage at that same point in time. FIG. 1 depicts such dynamically maintained configuration information 130 in volatile storage 180. As used herein, the term "dynamically maintained configuration information" is configuration information maintained in volatile storage. Other subsets of configuration information for resource set 160 may be kept in various locations in persistent storage.

In response to the detection of an undesirable state of application 110, it may be desired to restore the resource set 160 to the state it was in at a previous point in time. In addition, it may also be desired to restore the application data 120 to its state as of a previous point in time. Application 110 may reach an undesirable state due to a variety of reasons, including failure of hardware components, erroneous software or hardware operation, intrusions by viruses, worms or human agents leading to data corruption, overloading of resources leading to poor performance, and suboptimal configuration of resources. In general, an undesirable application state may be any application state from which recovery to an earlier state is desired. Undesirable states may be detected by human agents, or by automated functionality implemented in software or hardware. For example, when an administrator views the output of a graphical user interface of application 110, the administrator may discover that the application is displaying incorrect information, and thus determine that an undesirable application state exists. In other examples, software may be configured to periodically monitor application 110 to verify that it is in a desirable state based on some criteria, and recovery may be desired if the software detects an undesirable application state. Thus, for example, for an on-line transaction processing application, software may maintain a value representing the average transaction response time measured over the previous ten minutes, and if the value goes above a certain pre-defined threshold, the application may be determined to be in an undesirable state.

In order to restore resource set 160 to a state it was in at a previous point in time, configuration information for that point in time may be required. If some of the resources of resource set 160 had dependencies upon other resources of resource set 160, as described earlier, for example, the resources may have to be brought online in a sequence prescribed by the dependency information maintained as part of the configuration information. In other examples, tunable parameters whose values may have changed since the previous point in time may have to be reset to their values as of the earlier point in time.

Recovery software 140 in the embodiment shown in FIG. 1 is configured to retain a previous state 150 of dynamically maintained configuration information 130 by storing the state in persistent storage 170. Recovery software 140 may be further configured to restore resource set 160 to a previous state using the stored previous state 150. Additional functionality related to restoring application state may also be provided by recovery software 140. For example, if backup copies of application data 120 are made from time to time during normal operation of application 110, recovery software 140 may be further configured to store previous state 150 as part of a backup operation. In addition, recovery software 140 may further be configured to restore both resource set 160 and application data 120 to the state they were in when a backup operation was performed. In general, the restoration of resource set state and the restoration of data state may be independent activities. In some cases resource set recovery may not need to be accompanied by data state recovery. Recovery software 140 may also be further configured to detect an occurrence of an undesirable state of application 110, and to restore resource set 160 to a previous state in response to the detection of the undesirable state. In other embodiments, recovery software 140 may also be configured to collect a subset of configuration information required for recovery, for example, by querying the resources making up resource set 160.

As described above, configuration information for resource set 160 may be kept in volatile storage and in various locations in persistent storage during normal operation of computer system 100. If a subset of configuration information normally stored in persistent information changes over time, it may be overwritten; that is, only the latest values for various elements of configuration information may be available at a given point in time. Periodic system backups may not be sufficient to save a history of some of the changes made to such a subset of configuration information, for example if some of the configuration information changes several times between two successive backup operations. In order to retain this subset of the configuration information required for recovery to a specific point in time, recovery software 140 may be configured in one embodiment to combine configuration information from volatile storage with configuration information from various locations in persistent storage, and to store a previous state of the combined configuration information in a different location in persistent storage. The combined configuration information may be maintained as a data structure, which may, for example, be formatted and stored as a text file or implemented as a collection of records in a database table or tables. In other embodiments, other implementations for combining and storing the configuration information may be used, such as compressed or encrypted files. Recovery software 140 may be further configured to use the stored combined configuration information to restore the state of resource set 160.

Figure 2A:
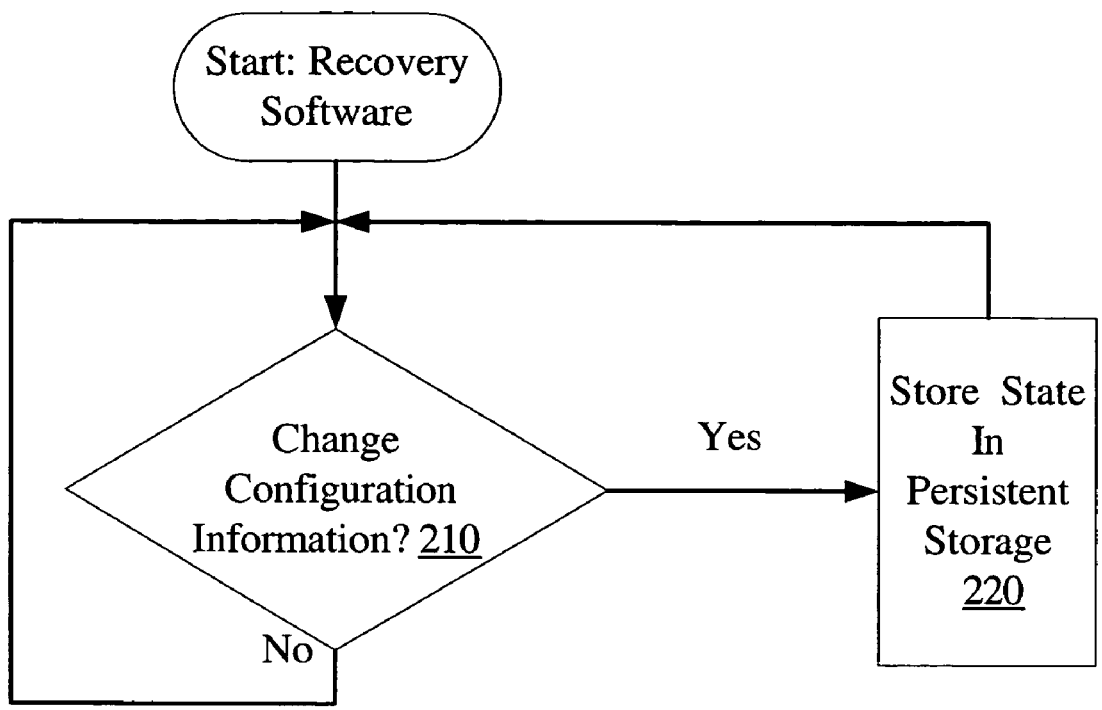
FIG. 2a, FIG. 2b, and FIG. 2c are flow charts illustrating aspects of the operation of various embodiments of recovery software shown in FIG. 1.
Figure 2B:
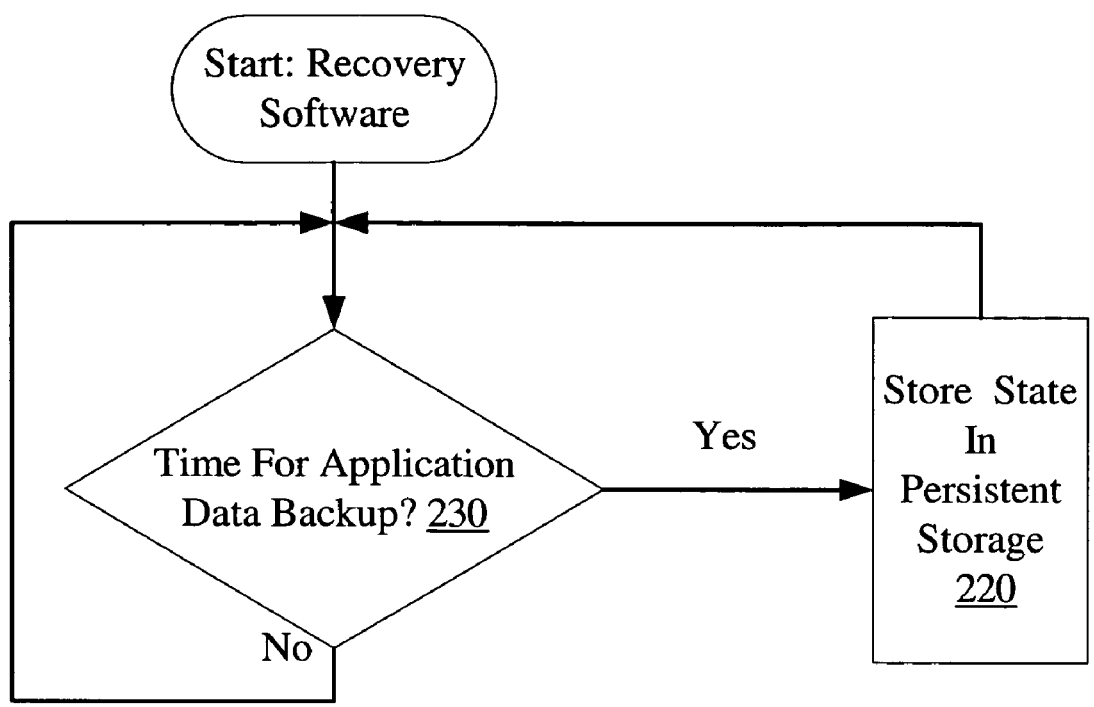
Figure 2C:
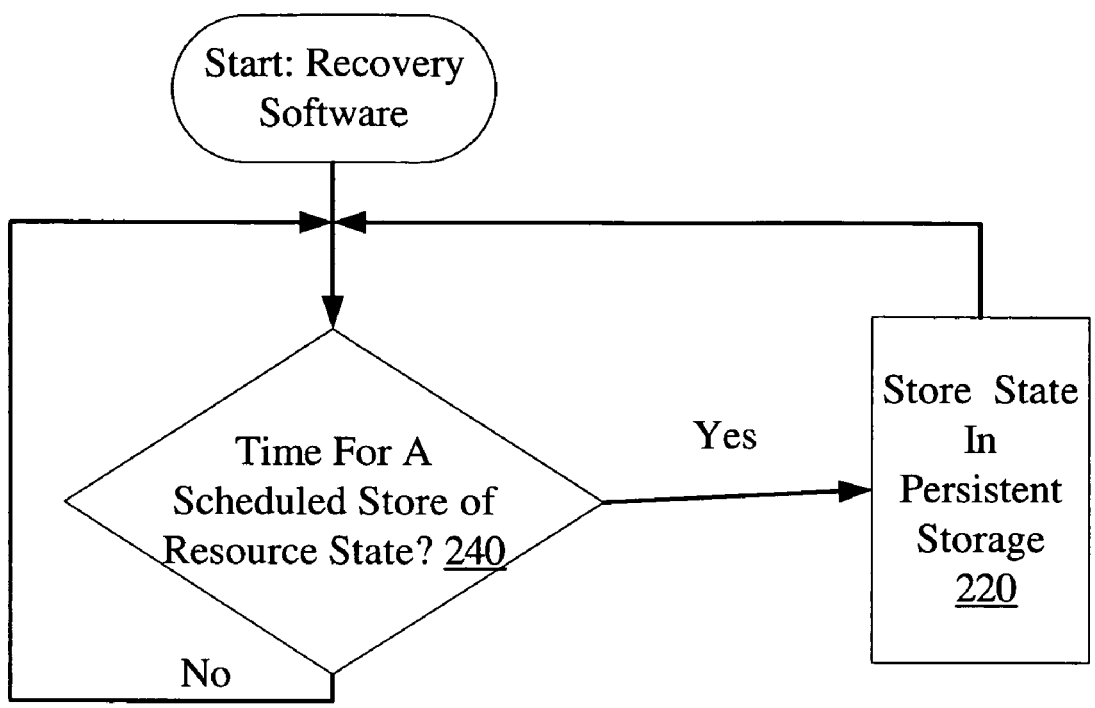

The points in time when the state of the configuration information 130 is stored to persistent storage 170 can vary in different embodiments of recovery software 140. The operation of three such embodiments is illustrated in FIGS. 2a-2c. In the embodiment shown in FIG. 2a, a change in the state of the configuration information triggers the storing to persistent storage, as illustrated in decision block 210; for example, configuration information may be stored (block 220) prior to making the change, thus providing a history of changes to the state of the resource set over time. In the embodiment shown in FIG. 2b, the state is stored when application data is backed up (decision block 230). In FIG. 2c, the recovery software stores the state according to a schedule (decision block 240) for example, once every hour. It is noted that other embodiments may use other decision mechanisms to determine the points in time at which the state is stored to persistent storage, including combinations in the mechanisms described in FIGS. 2a-2c. It should also be noted that in the embodiments shown in FIGS. 2b and 2c, the storage of the state to persistent storage occurs independently of changes in state; that is, configuration information may be stored to persistent storage at a series of points in time T0, T1, T2, . . . Tn, based on the decision mechanism used, even if the configuration information has not changed between T0 and Tn.

Figure 3:
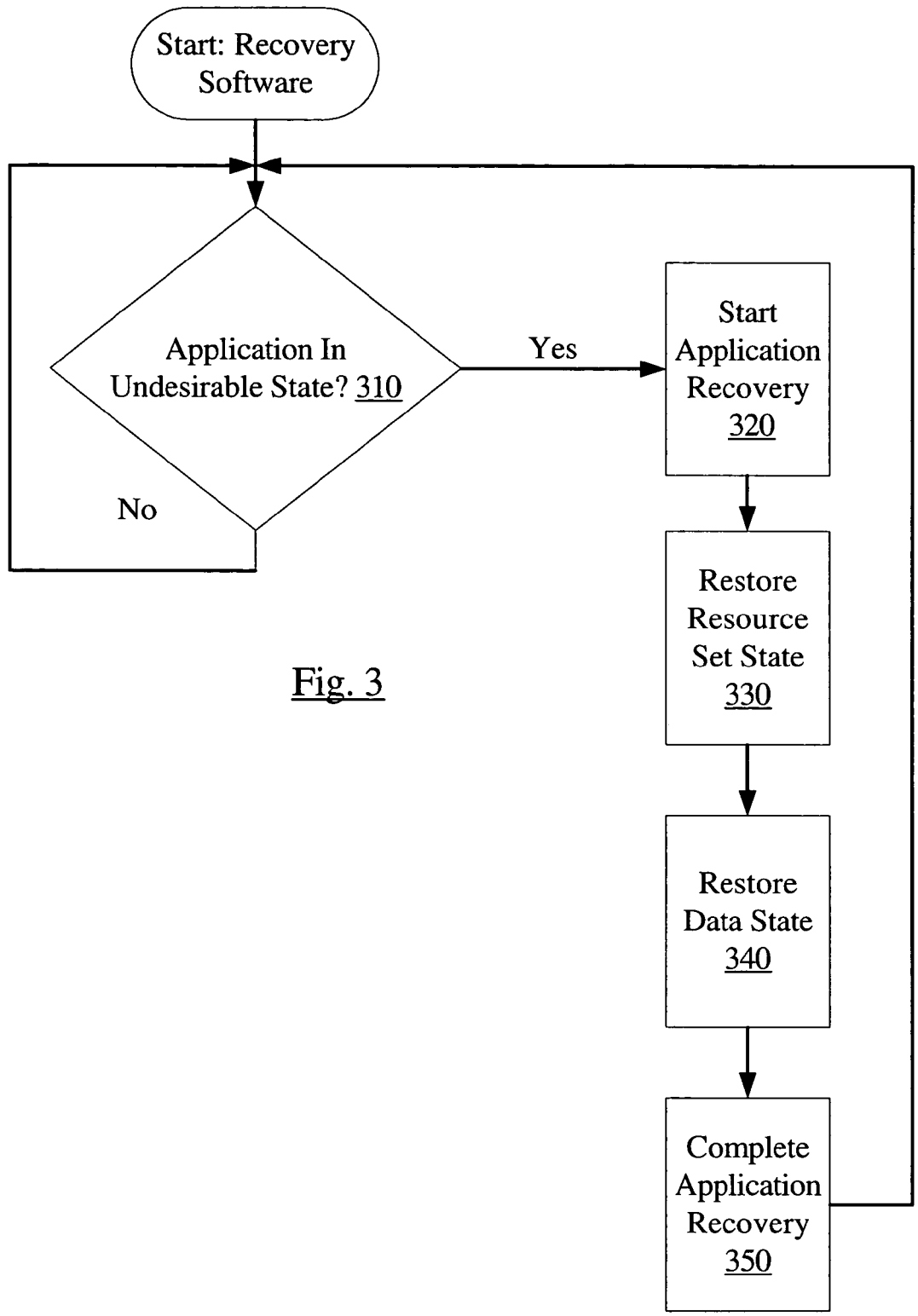
FIG. 3 is a flow chart illustrating further aspects of the operation of an embodiment of the recovery software shown in FIG. 1.

In FIG. 3, a flow chart that illustrates further aspects of one embodiment of the operation of recovery software 140 is shown. In this embodiment, recovery software 140 is further configured to periodically check whether application 110 is in a set of acceptable states (decision box 310) based on a list of acceptable states, and the application is detected to be in an undesirable state if it is not in one of the listed states.

If application 110 is found to be in an undesirable state, recovery software 140 starts application recovery (box 320). Recovery software 140 can start application recovery in various ways. In one embodiment, if the application is still running when recovery is beginning, the application is stopped by the recovery software. In other embodiments, the application may be suspended. When the cause of the undesirable application state is system failure, neither stopping nor suspending the application may be required. In other embodiments, the start of application recovery may include steps other than stopping and suspending of the application.

A further aspect involved in the start of application recovery in box 320 may be the determination of the point in time to which the application state is to be restored. For example, if application data 120 is backed up periodically, recovery software 140 may restore the application state to the state it was in when the last backup of the application data occurred.

In other embodiments, the point in time to which state is restored may be chosen in different ways, for example in response to administrator input; or the application state may be restored to the most recent point in time at which a state of dynamically maintained configuration information 130 was stored to persistent storage.

In FIG. 3, the state of application 110 is restored by first restoring resource set state (box 330) and then restoring data state (box 340). In other embodiments, data state may be restored prior to restoring resource set state, or resource state and data state may be restored in parallel or independently of each other. In yet other embodiments, the restoration of data state may be skipped altogether. For example, if the undesirable application state was caused by the setting of inappropriate tunable configuration parameter values for a database management system, resource set recovery may be accomplished by restoring the tunable parameter values back to their original values, with no accompanying restoration of the data contained in the database tables.

Finally, box 350 of FIG. 3 represents the completion of application recovery. This may include starting up the application 110 if it had been stopped as part of starting recovery, or resuming the application if it had been suspended.

Figure 4A:
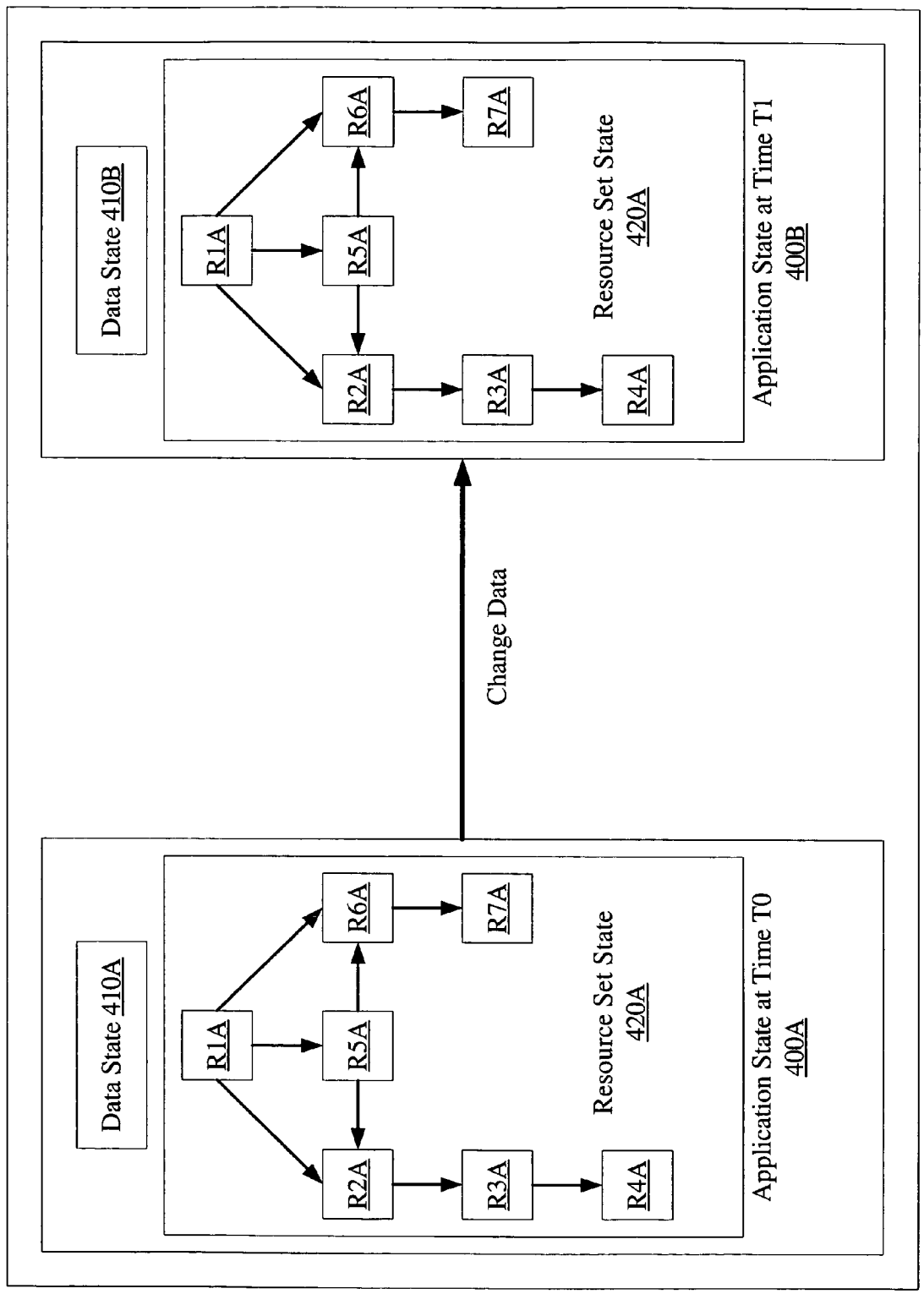
FIGS. 4a, 4b, 4c, and 4d are block diagrams illustrating an example of the operation of one embodiment of the computer system shown in FIG. 1, wherein the state of an application changes over time.

FIGS. 4a-4d illustrate an example of the operation of one embodiment of computer system 100, wherein application data 120 and dynamically maintained configuration information 130 for resource set 160 change over time, and recovery software 140 stores a previous state of the configuration information 150 to persistent storage 170 when the configuration information changes. Application state 400A at time T0 for application 110 is shown on the left of FIG. 4a. Application state 400A comprises a data state 410A and a resource set state 420A. In FIG. 4a, a change in data state occurs, such that the data state changes to 410B and application state changes to 400B between time T0 and time T1. A number of resources and their dependencies are illustrated as part of the resource set state. The resource set includes seven resources R1 through R7, whose states are labeled R1A through R7A in resource set 420A. An arrow leading from a resource X to a resource Y indicates that X depends on Y. Resource R1 depends on resources R2, R5 and R6. R2 in turn depends on R3, and R3 depends on R4. R5 depends on R3 and R6. R6 depends on R7. For example, R1 may represent application software, related shared libraries and tuning parameters for the application. R2 may represent a file system used by the application. R3 may represent volumes used by the file system, and R4 may represent disk groups used by the volumes. During recovery, the disk groups must be online before the volumes can be started, hence the dependency of R3 on R4. Similarly, the volumes must be started before the file system can be mounted, hence the dependency of R2 on R3. R6 may represent networking software and associated attributes such as TCP ports and IP addresses. R7 may represent network interface cards required to be operational for the networking software R6 to work. R5 may represent a database management system that depends on the file system R2 and the networking software R6. The change in data state in FIG. 4a is not accompanied by any change in resource state, so the resource set state remains unchanged between time T0 and time T1.

Figure 4B:
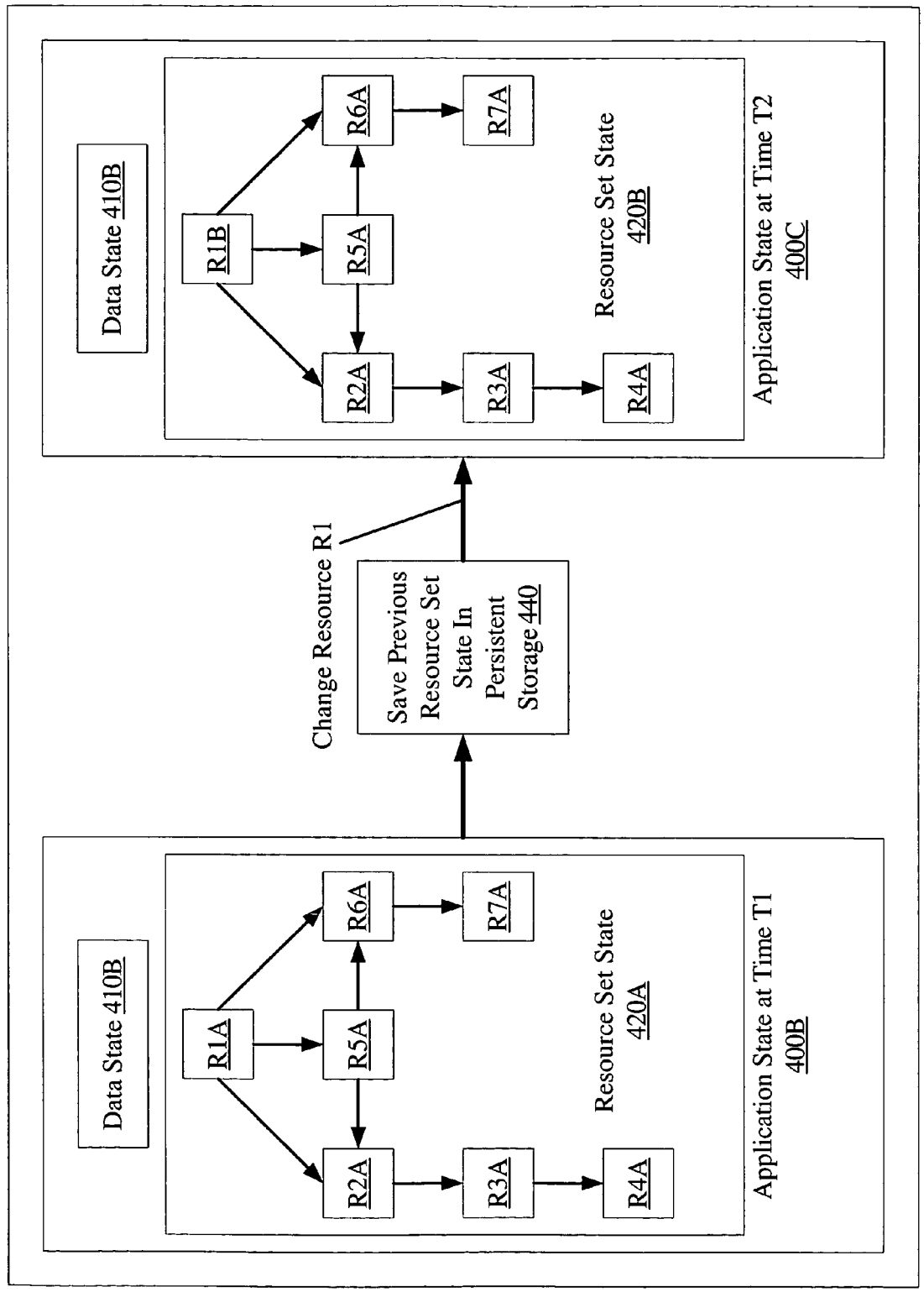

FIG. 4b illustrates a change of state of resource R1 from R1A to R1B between time T1 and time T2. For example, some application tunable parameters may be changed in response to high system utilizations. In the embodiment shown, the recovery software 140 is configured to store the dynamically maintained configuration information 130 whenever a change to the state occurs (as was illustrated in FIG. 2a). For example, prior to the change in resource R1, the state of the resources is stored to persistent storage as shown in box 440. The application state 400C at time T2 includes data state 410B (unchanged from time T1) and resource set state 420B.

Figure 4C:
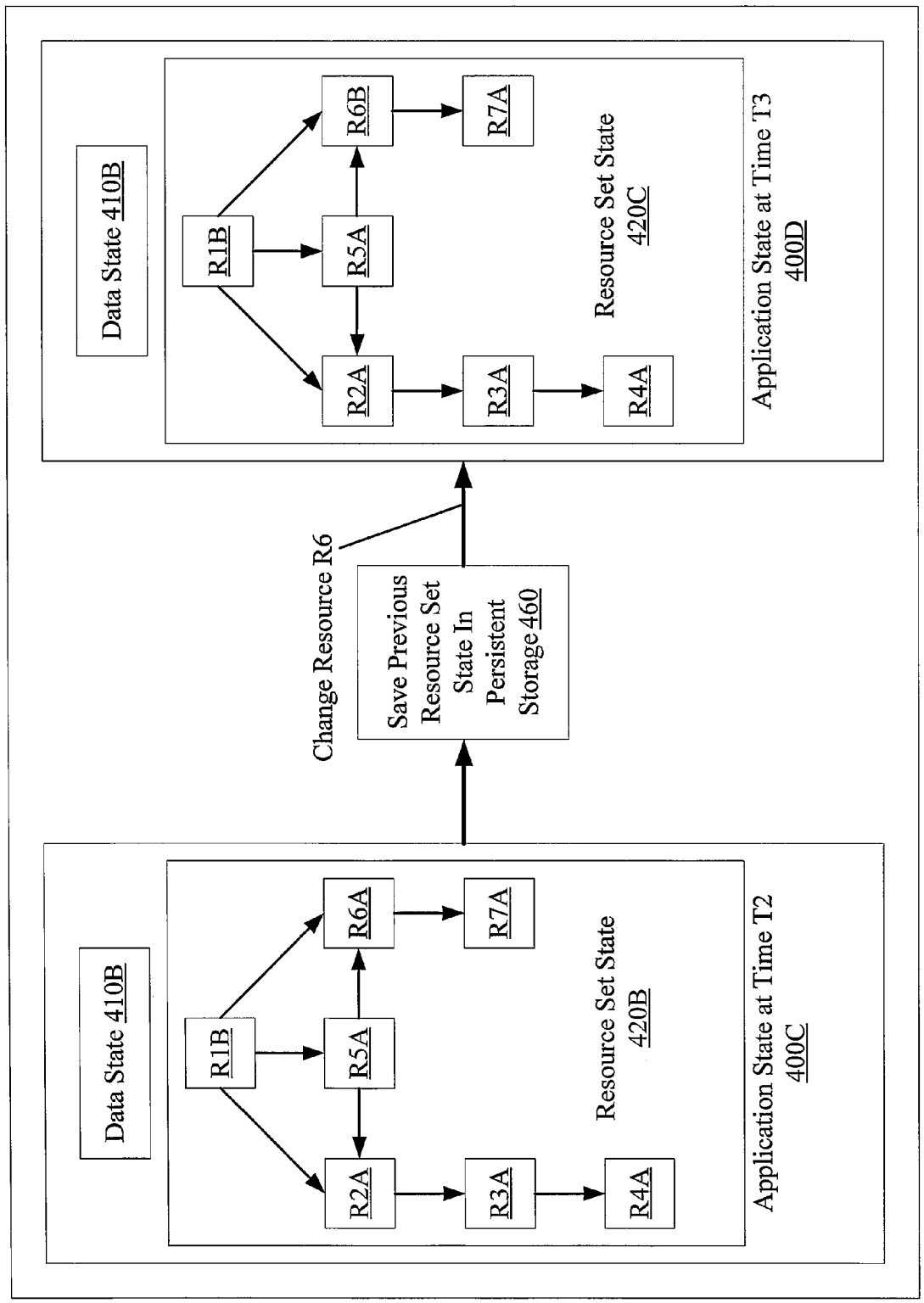

FIG. 4c illustrates a change of state of resource R6 from R6A to R6B between time T2 and time T3. For example, some networking parameters may be changed. As was illustrated in FIG. 4b for a different resource change, prior to the change in resource R6, recovery software 140 causes the state of the resources to be stored to persistent storage as shown in box 460. The application state 400D at time T3 includes data state 410B (unchanged from time T1) and resource set state 420C.

Figure 4D:
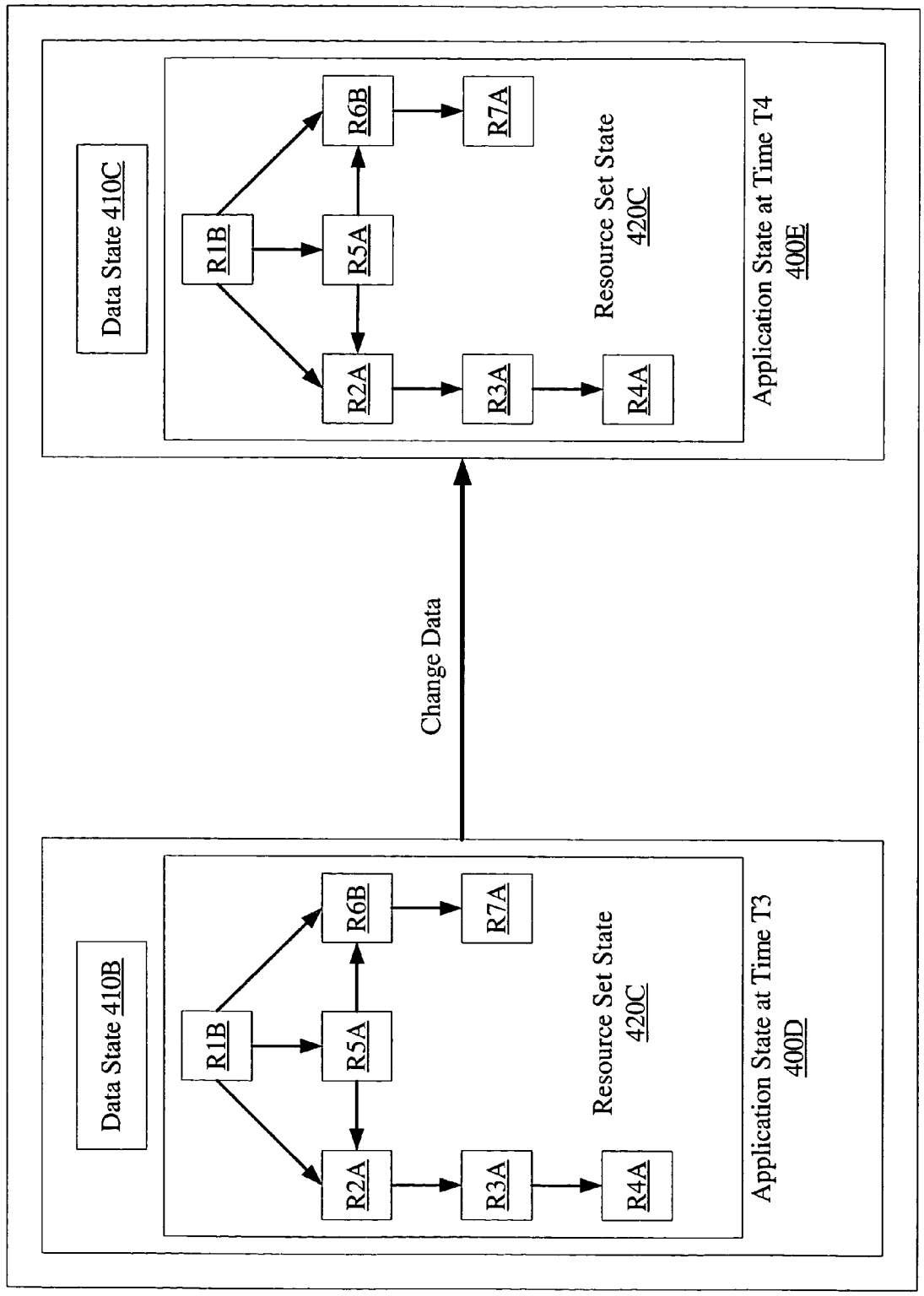

FIG. 4d illustrates a change of data state from state 410B at time T3 to 410C at time T4. No changes in resource state occur. At time T4, application state 400E includes data state 410C and resource state 420C.

Figure 5A:
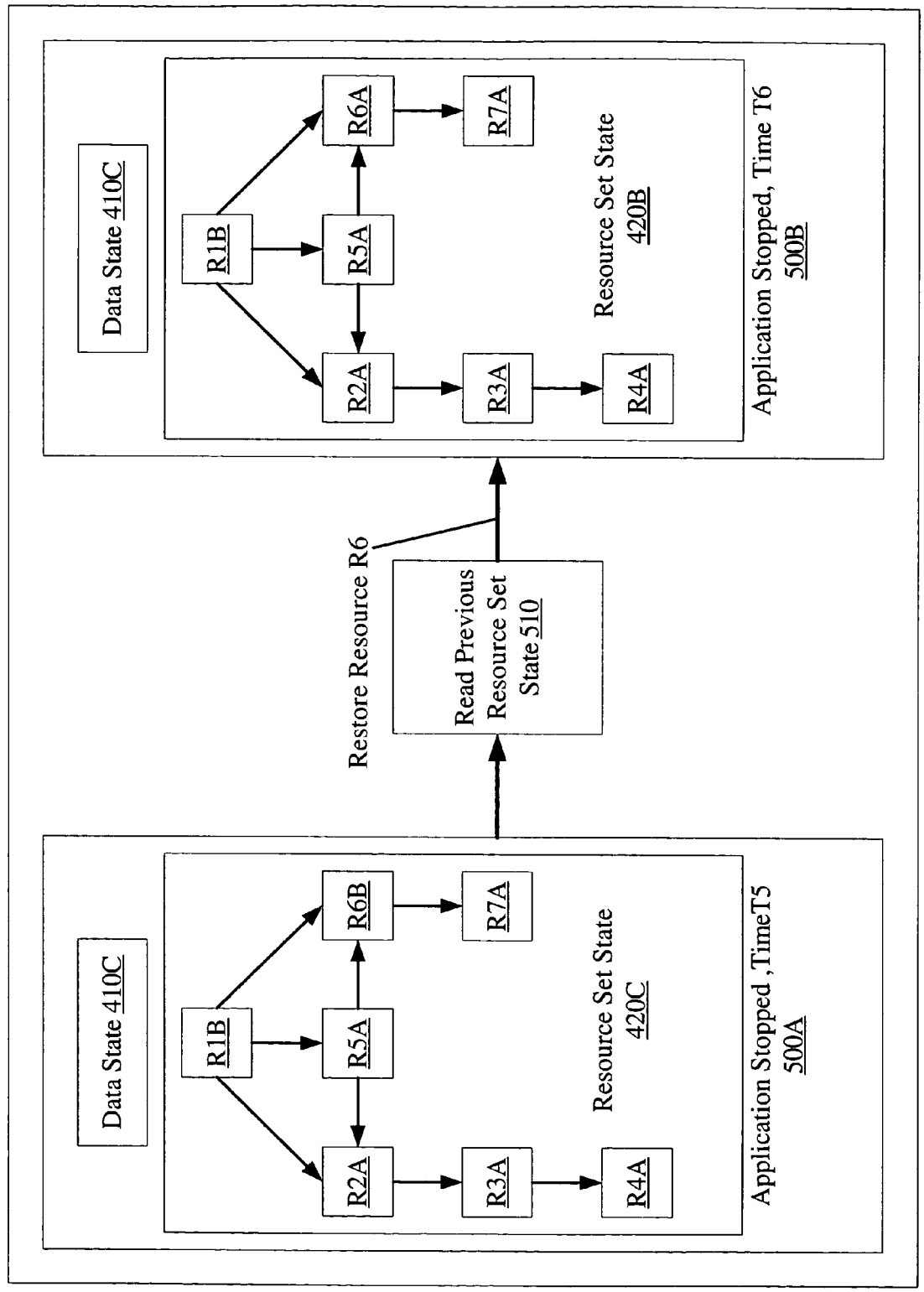
FIGS. 5a, 5b, 5c, and 5d are block diagrams collectively illustrating a continuation of the example shown in FIGS. 4a-4d, wherein recovery software restores the state of an application.

FIGS. 5a-5d collectively illustrate a continuation of the example shown in FIGS. 4a-4d, wherein recovery software 140 restores the state of application 110. While this step is not illustrated in FIGS. 5a-5d, application 110 is found to be in an undesirable state between time T4 (the time of application state 400E in FIG. 4d) and time T5 in FIG. 5a in this example. Recovery software 140 starts application recovery and stops application 110 prior to time T5. In FIG. 5a, the application is shown as being stopped (box 500A) at time T5 and the resource set state is 420C, as it was in FIG. 4d. The restoration of application state in this example includes both restoration of resource set state and restoration of data state. In the embodiment shown in FIGS. 5a-5d, the application resource set is first restored to its state as of time T0, and then the data state is restored to its state as of time T0. As described above, in other embodiments, the sequence in which resources and data is restored may differ. The recovery software reads a previous state of the resource set (box 510) to restore the state of R6 to R6A. At time T6, the application is still stopped (box 500B) as recovery continues, and the resource set state has been restored to 420B.

Figure 5B:
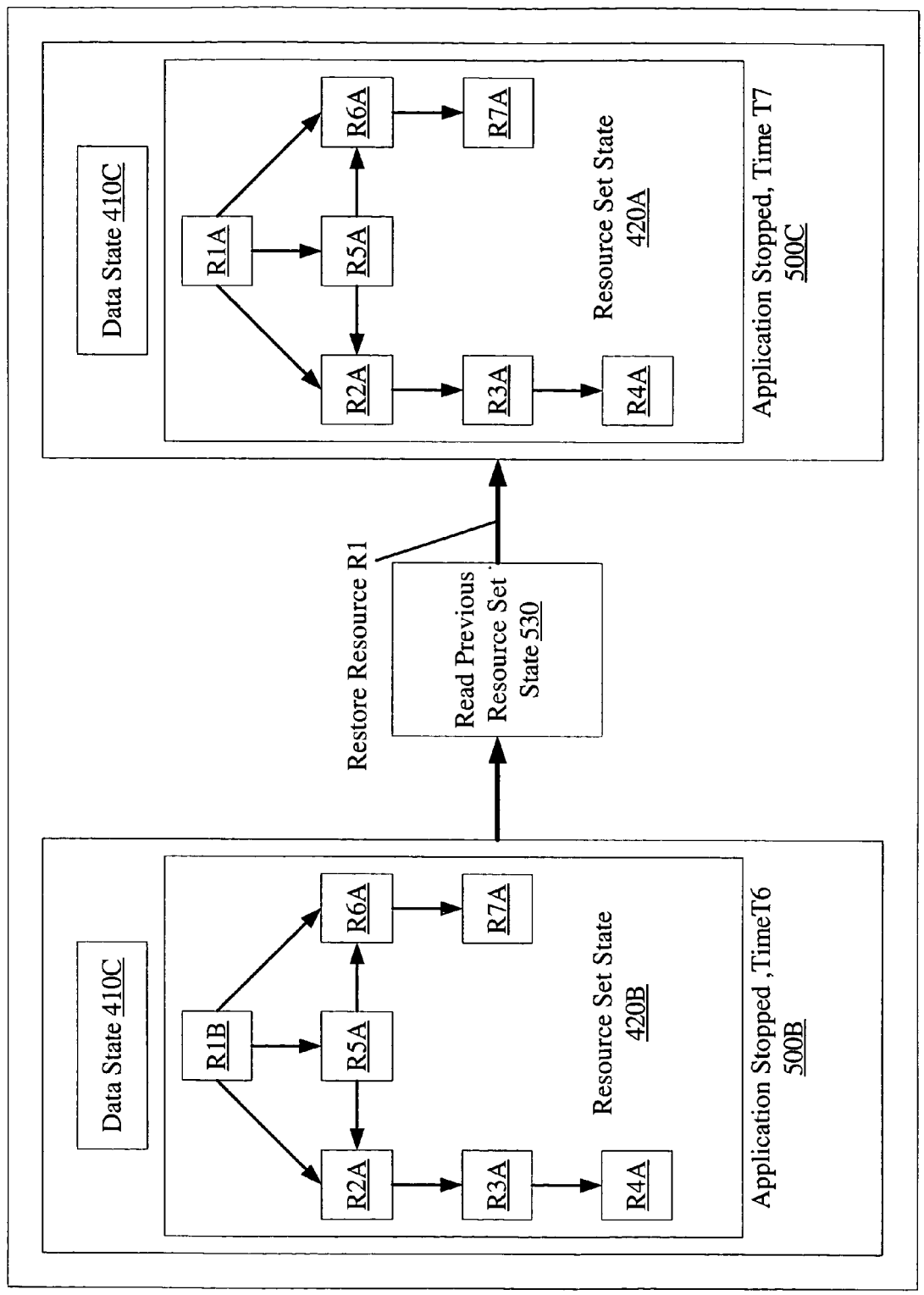

FIG. 5b shows the next step in the recovery of the application state for this example, where the state of resource R1 is restored to R1A. The recovery software reads a previous state of the resource set (box 530) to restore the state of R1. The application is still stopped at time T7 (box 500C).

Figure 5C:
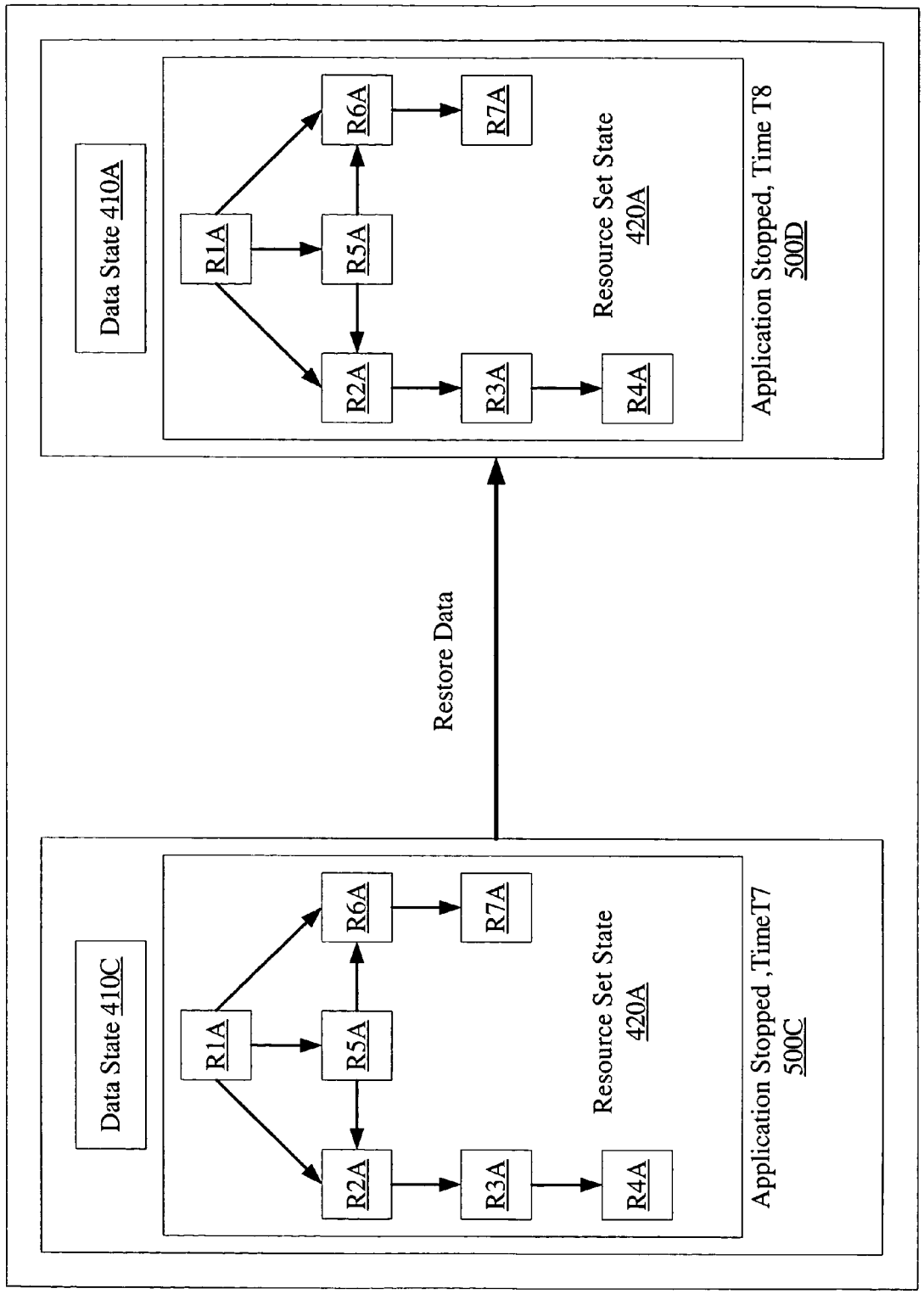
Figure 5D:
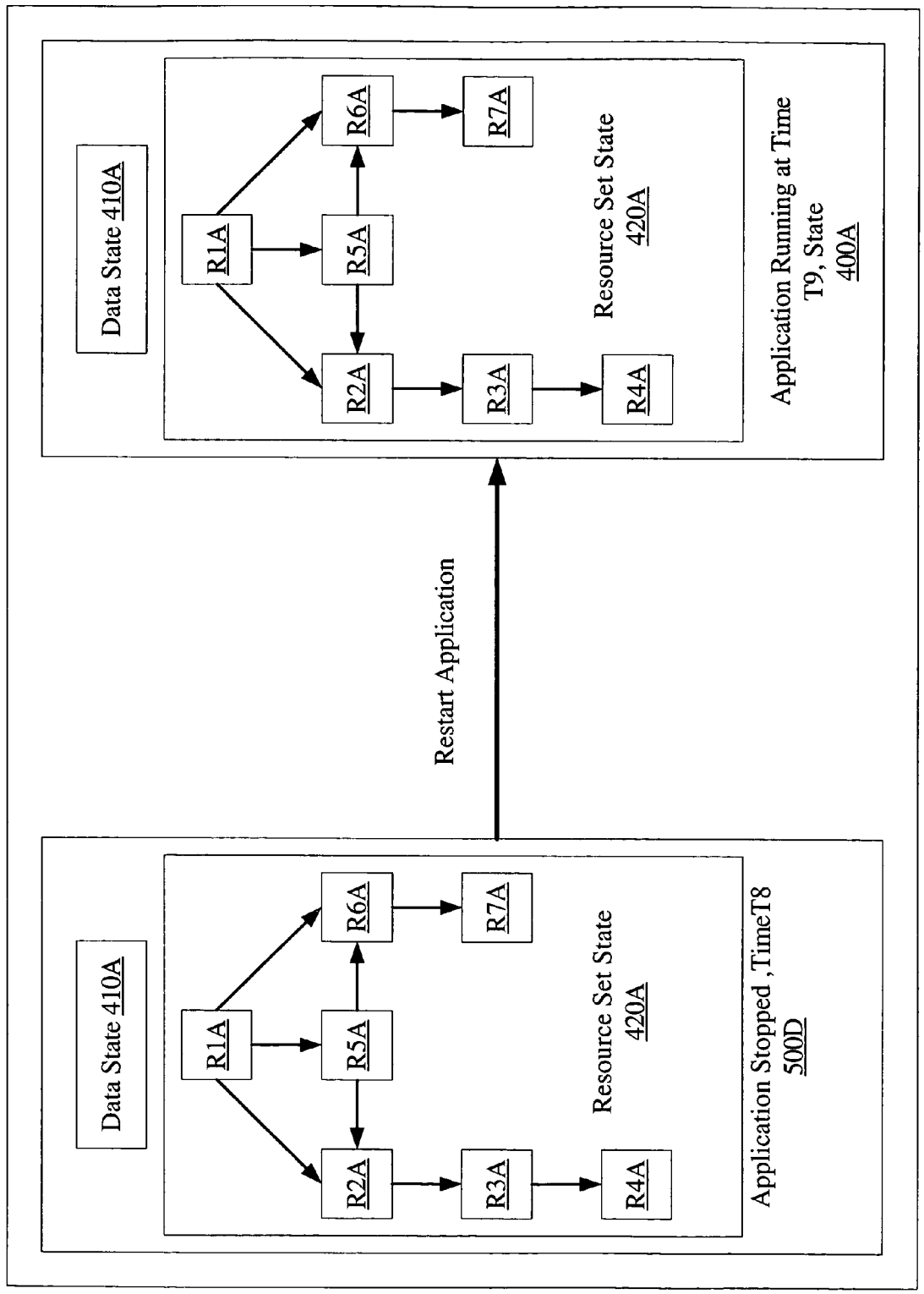

FIG. 5c shows the next step in the recovery of the application state, where the data is restored to its state as of time T0 (410A). FIG. 5d shows application 110 being restarted as part of recovery completion.

Figure 6:
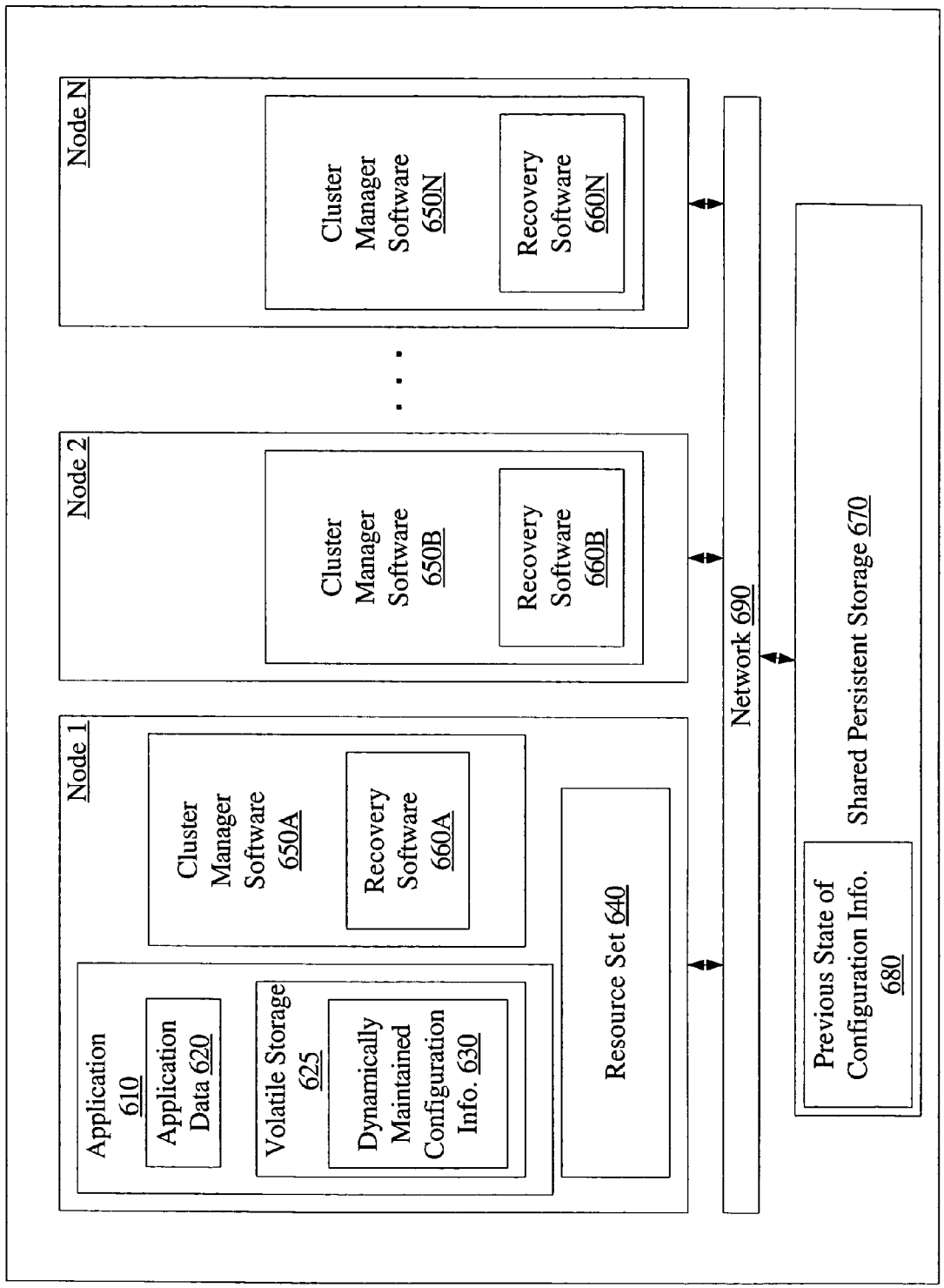
FIG. 6 is a block diagram illustrating an embodiment of a computer system configured as a cluster.

Recovery functionality similar to that described above may be employed in other specific computer system configurations. For example, FIG. 6 is a block diagram illustrating an embodiment of a computer system configured as a cluster of N nodes. A network 690 connects the nodes of the cluster to each other and to shared persistent storage 670. Nodes 1 through N of the cluster are configured to execute cluster management software 650A through 650N, respectively. In general, cluster management software may include any software used to provide high availability services to the users of a cluster, including, for example, functionality to monitor the states of the nodes and functionality to fail over an application from one node to another in the event of application failure or node failure.

In FIG. 6, application 610 utilizing resource set 640 runs on Node 1. Application 610 manipulates application data 620. Dynamically maintained configuration information 630 for resource set 640 is shown in volatile storage 625.

The cluster management software (650A . . . 650N) at each node includes recovery software 660A . . . 660N, wherein the recovery software is configured to provide functionality similar to the functionality of recovery software 140 described above. As such, recovery software 660A, for example, retains a previous state 680 of dynamically maintained configuration information 630 in shared persistent storage 670. If application 610 reaches an undesirable state while Node 1 remains operational, recovery software 660A may be further configured to restore the state of Application 610 using the previous state 680. Recovery software 650B . . . 650N may be further configured to obtain a copy of the previous state 680 from the shared persistent storage 670. In some contemplated embodiments, in the event that Node 1 fails, recovery software 650B . . . 650N may be configured to use a copy of the previous state 680 to restore the state of application 610 on a node other than Node 1.

As discussed in the description of FIG. 1, a subset of configuration information required for recovery of resource set 640 may reside in persistent storage in some embodiments. Recovery software 660A may be further configured to combine dynamically maintained configuration information 630 with configuration information from various locations in persistent storage, and storing the combined information in a different location in persistent storage.

In the embodiment illustrated in FIG. 6, the resource set 640 utilized by the application 610 is shown contained within Node 1. In other embodiments, the resource set may include a subset of the network 690, a subset of the shared persistent storage 670, and other resources that are shared across nodes or are otherwise not contained within Node 1. While cluster management software may include the recovery software as a subcomponent as in FIG. 6, in other embodiments the recovery software may not be a subcomponent of cluster management software.

In the embodiment shown in FIG. 6, the state of dynamically maintained configuration information is stored in shared persistent storage. In other embodiments, the state may be stored on persistent storage that is not shared across nodes.

The state of dynamically maintained configuration information 130 (or 630) may be stored using a variety of implementations. In some implementations, configuration information state may be stored incrementally; that is, only changes to the resources and the changes in the dependency relationships, relative to a previous stored state, may be stored to persistent storage. In other implementations, the complete configuration information may be stored each time, including the values of all the attributes of each resource and the dependency relationships among all resources. Combinations of these and other implementations may also be used.

In some contemplated embodiments, application data 120 (or 620) may include some configuration information. For example, an application may store TCP port numbers its subcomponents use to communicate with each other, in a database that forms part of the data state of the application.

Numerous additional variations are also possible. For example, while in the embodiments shown in FIGS. 1 and 6, a single application (110,610) is shown, in other embodiments, a computer system may comprise a plurality of applications. Each of the plurality of applications may utilize a resource set. Dynamically maintained configuration information may be required to restore the resource set for each application. In such embodiments, recovery software may be configured to retain a previous state of the configuration information for each resource set.

Figure 7:
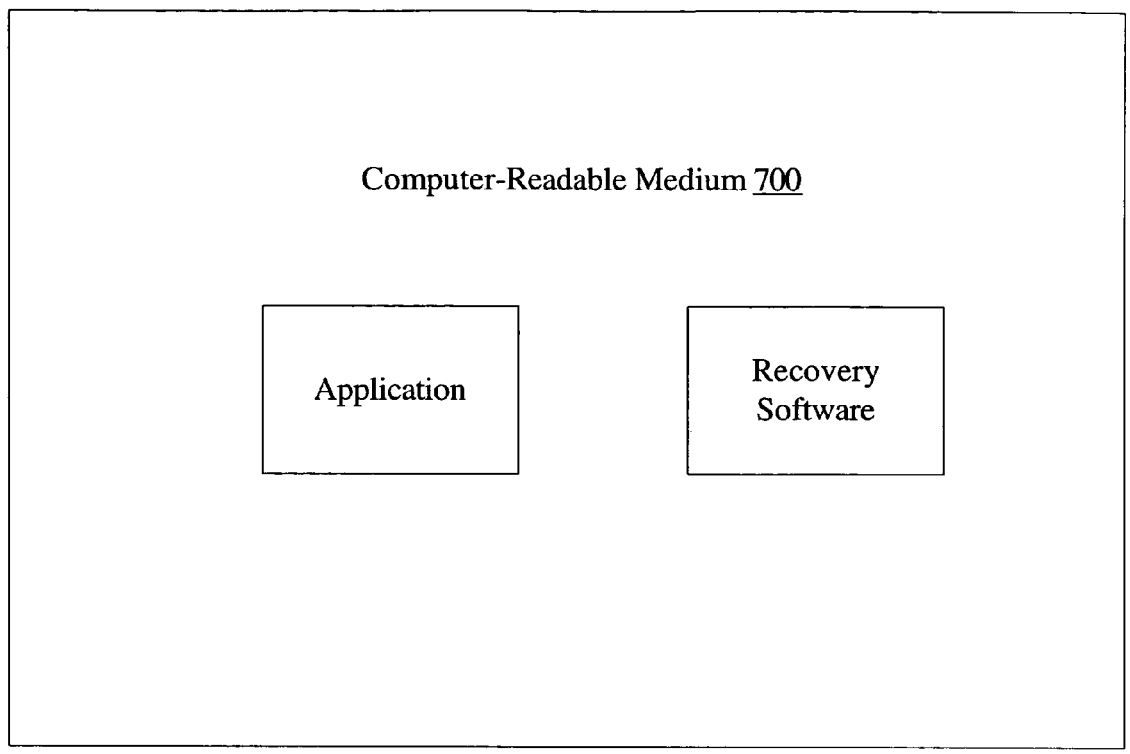
FIG. 7 is a block diagram illustrating a computer-accessible medium.

FIG. 7 shows a computer-accessible medium comprising instructions, which, when executed, run application 110 and recovery software 140. Generally speaking, the computer-accessible medium may include storage media such as magnetic, electrical, or optical media (such as disk-based storage, RAM (e.g., SDRAM, RDRAM, SRAM, etc.), ROM, CDs, DVDs, etc.), as well as transmission media or signals such as electrical, electromagnetic or digital signals, conveyed via a communication medium such as a network and/or a wireless link.

It is noted that the term "software", as used herein, refers to a set of instructions which, when executed, perform the functions described for that software. The instructions may be machine level instructions executed by a CPU, or may be higher level instructions defined in a given higher level language (e.g., shell scripts, interpretive languages, etc.). The term "program" may be synonymous with "software".

It is also noted that volatile storage 180 (and 625) may be implemented using a variety of media such as various forms of RAM (e.g., SDRAM, RDRAM, SRAM, etc.). Persistent storage 170 (and 670) may be any type of non-volatile storage. Examples of different implementations of persistent storage include disk-based storage, tape-based storage, and other persistent media such as compact discs or DVDs.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a memory storing program instructions that are executable by the computer system to implement:
    an application that, during execution, dynamically maintains configuration information for the set of resources currently being used by the application, wherein the configuration information includes dependency information describing dependencies among the set of resources; and
    recovery software that stores one or more previous states of the dynamically maintained configuration information, detects an occurrence of an undesirable state of the application by comparing the application against a set of states predetermined to be acceptable, and, in response to detecting the occurrence of an undesirable state, automatically initiates a restoration of the application on the computer system by restoring the set of resources to a state indicated by one of the stored previous states of the dynamically maintained configuration information, wherein the set of resources are restored in a sequence specified by the dependency information.

2. The computer system as recited in claim 1, wherein the set of resources comprises file systems and logical volumes, and wherein the configuration information dynamically maintained by the application includes information relating to one or more of the file systems and logical volumes.

3. The computer system as recited in claim 1, wherein the set of resources comprises physical disks and network interface cards, and wherein the configuration information dynamically maintained by the application includes information relating to one or more of the physical disks and network interface cards.

4. The computer system as recited in claim 1, wherein the set of resources includes persistent storage and database management software resources, and wherein the configuration information dynamically maintained by the application includes information relating to various ones of the persistent storage and database management software resources.

5. The computer system as recited in claim 1, wherein the recovery software is further executable to store a previous state of the configuration information in response to a change in the configuration information.

6. The computer system as in claim 1, wherein the recovery software is further executable to store a previous state of the configuration information according to a schedule.

7. The computer system as in claim 1, wherein the application manipulates data that is periodically backed up, wherein the recovery software is further executable to store a previous state of the configuration information as part of a backup operation for the data manipulated by the application.

8. The computer system as recited in claim 7, wherein the recovery software is further executable to use a previous state and a backup of the data to restore the set of resources and the data to their states as of a point of time when the data was backed up.

9. The computer system as recited in claim 1, wherein the program instructions are further executable to implement one or more other applications, wherein each other application utilizes a set of other resources, wherein configuration information is maintained dynamically for the set of other resources, wherein the recovery software is further executable to retain a previous state of the dynamically maintained configuration information for the one or more other applications by storing the state in persistent storage.

10. A computer system comprising:
a memory storing program instructions that are executable by the computer system to implement:
an application that, during execution, maintains configuration information for the set of resources currently being used by the application in a first set of locations in persistent storage and in a second set of locations in volatile storage, wherein the configuration information includes dependency information describing dependencies among the set of resources; and
recovery software that:
combines configuration information from the first and second sets of locations,
retains one or more previous states of the combined configuration information by storing the one or more previous states in persistent storage,
detects an occurrence of an undesirable state of the application by comparing the application against a set of states predetermined to be acceptable, and
in response to detecting the occurrence of an undesirable state, automatically initiates a restoration of the application on the computer system by restoring the set of resources to a state indicated by one of the retained previous states of the combined configuration information, wherein the set of resources is restored in a sequence specified by the dependency information.

11. A method comprising:
recovery software storing an indication of a set of resources utilized by an application dynamically maintaining configuration information for the set of resources, wherein the configuration information includes dependency information describing dependencies among the set of resources;
the recovery software retaining one or more previous states of the dynamically maintained configuration information by storing the one or more previous states in persistent storage;
the recovery software detecting an occurrence of an undesirable state of the application by comparing the application against a set of states predetermined to be acceptable; and
in response to detecting the occurrence of an undesirable state, the recovery software initiating, without user intervention, a restoration of the application by restoring the set of resources to a state indicated by one of the retained previous states of the combined configuration information, wherein the set of resources is restored in a sequence specified by the dependency information.

12. The method as recited in claim 11, further comprising the recovery software storing a previous state of the configuration information in response to a change in the dynamically maintained configuration information.

13. The method as recited in claim 11, further comprising the recovery software storing a previous state of the configuration information according to a schedule.

14. The method as recited in claim 11, further comprising the recovery software storing a previous state of the configuration information as part of a backup operation for data manipulated by the application.

15. The method as recited in claim 14, further comprising the recovery software using a previous state and a backup of the data to restore the set of resources and the data to their states as of a point of time when the data was backed up.

16. A tangible computer-readable memory medium storing program instructions that are executable on a computing device to implement:
recovery software for use with an application that utilizes a set of resources for which configuration information is dynamically maintained, wherein the configuration information includes dependency information describing dependencies among the set of resources, wherein the recovery software:
stores an indication of the set of resources utilized by the application; and
retains one or more previous states of the dynamically maintained configuration information by storing the one or more previous states in persistent storage, detects an occurrence of an undesirable state of the application by comparing the application against a set of states predetermined to be acceptable, and, in response to the detecting the occurrence of an undesirable state, automatically initiates a restoration of the application on the computing device by restoring the set of resources to a state indicated by one of the retained previous states of the combined configuration information, wherein the set of resources is restored in a sequence specified by the dependency information.

17. The computer-readable memory medium as recited in claim 16, wherein the recovery software further includes instructions, which, when executed, store a previous state in response to a change in the dynamically maintained configuration information.

18. The computer-readable memory medium as recited in claim 16, wherein the recovery software further includes instructions, which, when executed, store a previous state according to a schedule.

19. The computer-readable memory medium as recited in claim 16, wherein the recovery software further includes instructions, which, when executed, store a previous state as part of a backup operation for data manipulated by the application.

20. The computer-readable memory medium as recited in claim 19, wherein the recovery software further includes instructions, which, when executed, use a previous state and a backup of the data to restore the set of resources and the data to their states as of a point of time when the data was backed up.

* * * * *

UNITED STATES PATENT AND TRADEMARK OFFICE
CERTIFICATE OF CORRECTION

PATENT NO. : 7,640,454 B1  Page 1 of 1
APPLICATION NO. : 10/878955
DATED : December 29, 2009
INVENTOR(S) : Par Botes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Ninth Day of November, 2010

David J. Kappos
*Director of the United States Patent and Trademark Office*